May 11, 1937.   P. J. ROELFSEMA   2,080,064
DISTILLATION PROCESS FOR THE PURIFICATION OF ALCOHOLS
Filed Oct. 25, 1935
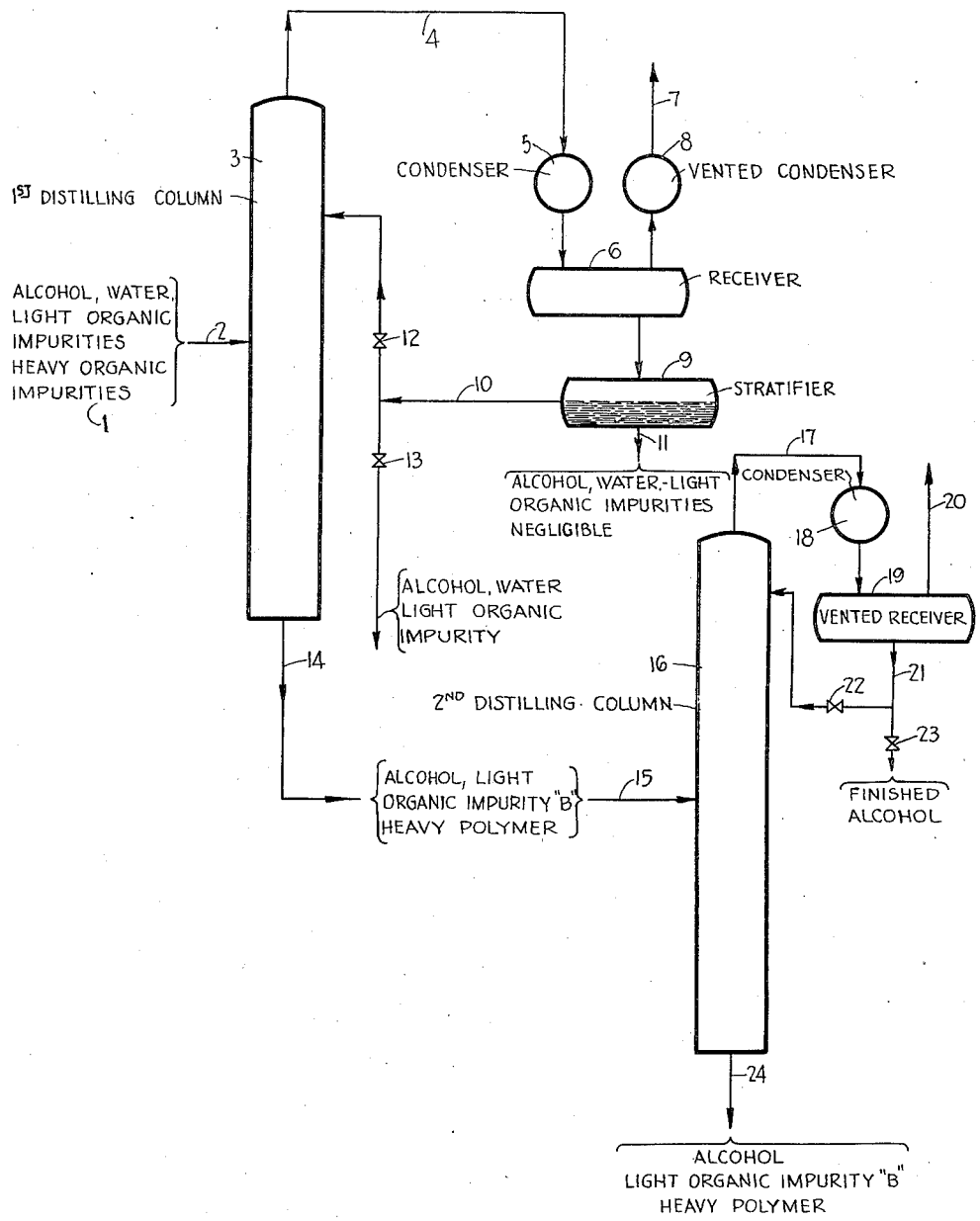
INVENTOR- PETRUS JURJEN ROELFSEMA.
BY HIS ATTORNEY Arthur B Bakalar Patented May 11, 1937

2,080,064

UNITED STATES PATENT OFFICE 2,080,064

DISTILLATION PROCESS FOR THE PURIFICATION OF ALCOHOLS

Petrus Jurjen Roelfsema, Martinez, Calif., assignor to Shell Development Company, San Francisco, Calif., a corporation of Delaware Application October 25, 1935, Serial No. 46,739

14 Claims. (Cl. 202—39)

This invention relates to the manufacture of secondary alcohols and deals particularly with a novel method for the purification of crude secondary alcohols containing water and organic impurities. The invention provides an improved distillation procedure whereby such impurities may be effectively eliminated with minimum difficulty and expense and without material loss of alcohol.

My invention may be applied with particular advantage to the purification of crude secondary alcohols and crude secondary alcohol mixtures such as are obtained as intermediate products in the manufacture of such alcohols by absorption of the corresponding olefine or olefines in a suitable mineral acid acting medium, such, for example, as a sulfuric or phosphoric or benzene sulfonic acid or a sodium bisulfate solution and hydrolysis of the resulting absorption product. The invention is not limited to this particular source of crude starting material, however, as it may be applied with equal success to any secondary alcohol mixture containing impurities of a similar nature.

I have found that the so-called polymer impurities present in such crude secondary alcohols are not a simple mixture of limited boiling range, as has been thought, but are made up of at least two fractions of distinctly different boiling ranges and different stabilities under alcohol distillation conditions. While the exact chemical constitution of neither of these fractions has been fully determined and apparently may vary widely depending upon the source and previous treatment, if any, of the crude secondary alcohol mixture, I have nevertheless observed that it is the heavier fraction of organic impurities, boiling usually above the boiling point of the associated secondary alcohol, which has the greater tendency to resinify, particularly in the absence of sufficient of an inert diluent, under the usual conditions of distillation of the alcohol. Based upon this better understanding of the problem I have developed a commercially applicable distillation procedure whereby a very complete removal of these impurities may be simply effected without resort to the expensive extraction methods heretofore employed and without danger of discoloring the product or gumming up the alcohol still as a result of tar and resin formation.

The process of my invention essentially comprises subjecting the crude secondary alcohol containing material to suitable treatment for removal of the lower boiling impurities including dissolved olefines and paraffins, stable light polymers, any ketones, ethers, or other oxygen containing organic impurities which may be present and water, and then distilling from the resulting anhydrous alcohol-heavy-polymer mixture only sufficient of the substantially pure alcohol as product as will leave as bottoms a stable alcohol solution of the heavy polymer.

For the purpose of making my invention more clear it will be described with more particular reference to the production of a secondary alcohol or a mixture of secondary alcohols by absorption of the corresponding olefine or olefines in a suitable mineral acid-acting medium and hydrolysis of the resulting absorption product. Suitable methods for carrying out such secondary olefine absorption and hydrolysis procedures are described, for example, in United States Patents 1,938,177 and 1,955,417. The crude secondary alcohol which is the starting material for my novel purification process may be recovered from the hydrolyzed products of such processes in any suitable manner. Resort may be had to extraction with suitable solvents, or vacuum or other low temperature distillation or flash distillation, or the like. With secondary alcohols containing more than four carbon atoms, the process of dilution and decantation described in United States Patent 1,955,416 may be advantageously used. However the processes of secondary olefine absorption, alkyl ester hydrolysis and recovery of crude secondary alcohol are carried out, the latter will contain, in accordance with my invention appreciable quantities of at least three different types of impurity, namely light organic impurities, by which is meant organic materials which (whatever their true boiling points may be) are capable of forming azeotropes or other mixtures with other components of the crude secondary alcohol which boil below the boiling point of the binary secondary alcohol-water azeotrope, water and higher boiling organic material at least some of which tends to resinify under normal conditions of distillation of the alcohol, and will thus be understood to refer preferably to crude intermediate alcohol products from which occluded gases, and/or the corresponding olefine and paraffin compounds have been substantially removed.

The following example illustrates the application of my invention to the production of substantially pure secondary butyl alcohol by absorption of $\alpha$ and $\beta$ butylene in aqueous sulfuric acid, but it will be understood that this implies no limitation as my invention is equally advantageous in the purification of crude isopropyl, secondary amyl, secondary hexyl and like alcohols or mixtures thereof manufactured by suitable modification of the same method or other equivalent procedures.

Secondary butyl alcohol may be manufactured by absorbing the α and β butylene content of a butane-butylene fraction of cracked petroleum oil, preferably after suitable selective removal of the bulk of the isobutylene present, in a suitable sulfuric acid solution. A sulfuric acid concentration of about 70–90% may be used for the absorption of the secondary butylenes. The absorption product may then be diluted and hydrolyzed to substantially convert the secondary butyl sulfates formed to free sulfuric acid and secondary butyl alcohol. The hydrolyzed mixture, which may or may not contain small amounts of unconverted alkyl sulfates, may be fed, advantageously after further dilution, to a stripping column supplied with open steam, the dissolved butane and butylenes vented off and the condensate stratified and separated from the aqueous layer formed, to give, in one typical case, a crude alcohol of the following approximate average composition:

| | Per cent by weight |
|---|---|
| Alcohol | 74.9 |
| Water | 21.6 |
| Light organic impurities | 1.8 |
| Heavy polymer | 1.8 |

Prior methods for removing the light organic impurities, as above defined, present in such crude secondary alcohol mixtures have involved attempts to effect their separation all together in one step. While the fact that these impurities do all appear together in the overhead as long as water is present makes this appear a possible method of effecting their removal from the crude mixture, I have nevertheless found that by taking advantage of an important difference in azeotropic behaviour which is exhibited by certain components present in the light organic impurities, their complete removal in two different steps may be more simply and economically effected.

Since it is not as yet certain that either of the two different fractions into which the light organic impurities may be divided in accordance with their different azeotropic behaviour, is a pure compound, they will, for convenience be designated as impurity A and impurity B. In the case of crude secondary butyl alcohol there is some evidence that impurity A is at least in large part a dibutylene, while impurity B appears to exhibit distillation characteristics similar to a butyl ether, but as the evidence is not conclusive it will be understood that I am not to be limited to such an interpretation of the results I obtain by my novel method of operation. It is, however, well settled that in the absence of water substantially only impurity A appears overhead in distillation of a crude secondary alcohol, while impurity B remains in the bottoms with the alcohol. It therefore appears that while impurity A forms a binary minimum boiling mixture with the secondary alcohol, impurity B does not do so but forms an azeotrope of higher order with that alcohol and water and perhaps impurity A. Accordingly a very simple procedure, remarkably free of control difficulties, may be used to separate these impurities from the secondary alcohol in two major steps as follows:

*First.*—Distilling the crude secondary alcohol to remove therefrom a top product consisting of substantially all impurity A, some impurity B, substantially all the water and a minor part of the secondary alcohol. Thus leaving a substantially anhydrous bottom product comprising the bulk of the secondary alcohol, a substantial amount of impurity B and substantially all the heavy polymer material present in the crude starting material.

*Second.*—Distilling the bottom product of step one to take off as top product substantially pure secondary alcohol and leave as bottoms a mixture of heavy polymer, the remainder of impurity B and said secondary alcohol which is substantially stable toward resinification under the conditions of the distillation.

As applied to the purification of a crude secondary butyl alcohol of the above described composition in which the light organic impurities are made up of about equal amounts of impurity A and impurity B, I may proceed as follows. First, I preferably distill from the crude mixture a ternary azeotrope boiling between 81 and 84° C. having the following approximate composition:

| | Per cent by weight |
|---|---|
| Secondary butyl alcohol | 32 |
| Water | 17 |
| Light organic impurity | 51 |

On condensation and stratification of this distillate two layers of the following relative composition are formed:

| | Per cent by weight |
|---|---|
| Upper layer: Secondary butyl alcohol | 36.1 |
| Water | 4.5 |
| Light organic impurity | 59.5 |
| Lower layer: Secondary butyl alcohol | 8.1 |
| Water | 91.8 |
| Light organic impurity | 0.02 |

By separating the upper layer and continuously but partially returning it to the column substantially all the water may be removed from the crude secondary alcohol. It is impractical, however, to simultaneously remove all the light organic impurity, and is more advantageous to withdraw as bottom product a mixture of secondary butyl alcohol, impurity B and heavy polymer. Such a bottom product will have in the case here used as an illustration the following approximate composition:

| | Per cent by weight |
|---|---|
| Secondary butyl alcohol | 96.5 |
| Light organic impurity B | 1.1 |
| Heavy polymer material | 2.4 |

This represents about a 96.5% recovery of the secondary butyl alcohol content of the original crude alcohol.

On distillation of this anhydrous bottom product substantially pure secondary butyl alcohol of the following characteristics may be obtained:

| | |
|---|---|
| Secondary butyl alcohol content | Not less than 99% |
| Distillation range (A. S. T. M.) | Below 95° C. none |
| | Above 101° C. none |
| | More than 90% distills between 97° and 100° C. |
| Non-volatile matter | Less than 0.005% |
| Sp. Gr. 20/20 | 0.810±.002 |
| Color | Water white |

Only so much of this product should be taken off as will leave a stable alcoholic solution of the heavy polymer which will not resinify under the conditions of distillation. A suitable composition of bottom product in the above case is one containing not more than about 40% and preferably not more than 30% by weight of heavy polymer material. Such a bottom product will have the following approximate composition:

|  | Per cent by weight |
| --- | --- |
| Secondary butyl alcohol | 56.3 |
| Light organic impurity B | 13.7 |
| Heavy polymer | 30.0 |

The yield of pure secondary butyl alcohol in this instance, exclusive of that recoverable from side streams, is about 92.0%.

The flow of materials in accordance with this method of carrying out my invention is shown in the drawing where 1 represents a source of a crude secondary butyl alcohol which is fed via pipe line 2 to a fractionating column 3 in which substantially all the water and light impurity A are taken off overhead through outlet 4 along with some alcohol. The overhead distillate is condensed in condenser 5 and collected in receiver 6 which is vented to the atmosphere at 7 through condenser 8. The condensate is allowed to stratify in separator 9 and the upper layer continuously withdrawn through pipe line 10 while the lower layer is similarly removed at 11. The withdrawn upper layer is separated into two parts the proportions being regulated by valves 12 and 13 so that sufficient reflux may be maintained in the column. Anhydrous bottom product is drawn off at 14 and fed via pipe line 15 to a second column 16. Both columns are heated by conventional means not shown. In column 16 specification grade anhydrous secondary butyl alcohol is taken off overhead through pipe line 17, condensed in condenser 18 and collected in receiver 19 which is vented at 20. The finished product is drawn off via line 21 and a part returned as reflux by adjustment of valves 22 and 23. Simultaneously a mixture of alcohol, light organic impurity B and heavy polymer is removed as bottoms at 24.

Several alternative procedures are available for the removal of the light organic impurities and water from crude intermediate secondary alcohol cuts prior to the final step of separating a stable alcoholic solution of the heavy polymer material. Since the light organic impurities form pseudo ternary azeotropes with water and alcohol they may be removed in a properly designed column by fractionating off the pseudo azeotrope. In the case of secondary butyl alcohol, however, the azeotrope boils at between 80.8 and 84.5° C. while the binary secondary butyl alcohol-water azeotrope boils at 87.5° C. This small temperature difference would necessitate the use of high reflux ratios and correspondingly high heat consumption. With isopropyl alcohol, however, the ternary azeotrope boils at about 61.7° C., about 18° C. lower than the binary azeotrope so the process can be carried out more economically. Following the removal of the light organic impurities by azeotropic distillation, the remainder of the water may be separated by any suitable conventional dehydration procedure.

Another method of operation applicable to all crude secondary alcohol mixtures comprises first dehydrating the mixture with the aid of a suitable third agent such as pentane, hexane, isooctane, nonane, benzol, xylene, carbon tetrachloride, ethylene chloride, cyclohexane, isopropyl acetate, or the like which form suitable azeotropes with the alcohol and water. In many cases the third agent may advantageously be also used as an alcohol extraction agent whereby a part of the water present in the crude alcohol may be eliminated before distillation. After dehydration of the crude alcohol the light organic impurities may be removed by separate distillation. The separation of the light organic impurities may, for example, be effected by azeotropic distillation with regulated amounts of water added to the dehydrated product or by carrying out such an azeotropic distillation using a product from which the water has been reduced to the proper predetermined extent.

It will be evident that my invention may be carried out in batch stills or in intermittently or continuously operated fractionating columns. The alcohol content of the various side streams may, in any case, be recovered by return of these fractions to appropriate steps in the alcohol manufacturing procedure or by separate distillation or extraction. For example, the heavy polymer containing bottoms of the last distillation may be steam distilled to separate aqueous alcohol and leave as bottoms aqueous polymer too dilute for resinification.

Other obvious modifications of my procedure will be evident to those skilled in the art of purifying alcohols and my invention is therefore to be regarded as limited only by the terms of the accompanying claims in which it is my intention to claim all novelty inherent therein as broadly as is possible in view of the prior art.

I claim as my invention:

1. A process of producing a crude secondary alcohol obtained in the manufacture of secondary alcohol by absorption of the corresponding olefine in a mineral acid acting medium and hydrolysis of the resulting absorption product which comprises distilling said crude secondary alcohol to remove therefrom a top product comprising light organic impurities including polymer and substantially all the water contained therein and then distilling the bottom product substantially devoid of said light impurities and said light polymer to recover therefrom secondary alcohol in a substantially pure form but only distilling to that point where the second bottom product essentially consists of a mixture of heavy polymer and said alcohol which is substantially stable toward resinification under said distillation conditions whereby gumming up of the still is substantially avoided.

2. A process of purifying a crude secondary alcohol obtained in the manufacture of secondary alcohol by absorption of the corresponding olefine in a mineral acid acting medium and hydrolysis of the resulting absorption product which comprises distilling said crude secondary alcohol to remove therefrom a top product comprising a part of the light organic impurities including polymer and substantially all the water contained therein and produce a bottom product containing the remainder of said light organic impurities, substantially all the heavy polymer content of the crude alcohol and the bulk of the secondary alcohol but materially devoid of light polymer, and then distilling from said bottom product only such a part of the secondary alcohol content as will leave as a second bottom product a mixture of said heavy polymer and said alcohol which is substantially stable toward resinification under said distillation conditions.

3. A process of purifying a crude secondary alcohol obtained in the manufacture of secondary alcohol by absorption of the corresponding olefine in a mineral acid acting medium and hydrolysis of the resulting absorption product which comprises distilling from said crude secondary alcohol a top product comprising substantially all the water and all of that part of the light organic impurities present therein including polymer which form a minimum boiling mixture with said secondary alcohol in the absence of water and leaving a bottom product containing a substantial amount of a light organic impurity which forms with said secondary alcohols and water a minimum boiling mixture, substantially all the heavy polymer content of the crude alcohol and the bulk of the secondary alcohol but materially devoid of light polymer, and then distilling from said bottom product only such a part of the secondary alcohol content as will leave as a second bottom product a mixture of said heavy polymer and said alcohol which is substantially stable toward resinification under said distillation conditions.

4. A process of purifying a crude secondary alcohol obtained in the manufacture of secondary alcohol by absorption of the corresponding olefine in a mineral acid acting medium and hydrolysis of the resulting absorption product which comprises distilling from said crude secondary alcohol a constant boiling mixture comprising water, said secondary alcohol and light organic impurity including polymer a part of which forms a minimum boiling mixture with said secondary alcohol in the absence of water and another part of which forms no binary minimum boiling mixture with said alcohol, recovering as bottoms a substantially anhydrous mixture comprising the bulk of the secondary alcohol, a substantial amount of that part of said light organic impurity which forms no binary minimum boiling mixture with said alcohol and substantially all the heavy polymer content of the crude alcohol and the bulk of the secondary alcohol but materially devoid of light polymer, and then distilling from said bottom product only such a part of the secondary alcohol content as will leave as a second bottom product a mixture of said heavy polymer and said alcohol which is substantially stable toward resinification under said distillation conditions.

5. A process of purifying a crude secondary alcohol obtained in the manufacture of secondary alcohol by absorption of the corresponding olefine in a mineral acid acting medium and hydrolysis of the resulting absorption product which comprises distilling from said crude secondary alcohol a constant boiling mixture comprising water, said secondary alcohol and light organic impurity including polymer a part of which forms a minimum boiling mixture with said secondary alcohol in the absence of water and another part of which forms no binary minimum boiling mixture with said alcohol, condensing the vapors of said constant boiling mixture, separating light organic impurity from the condensed constant boiling mixture, continually returning separated light organic impurity to the distillation zone until substantially all the water in the crude secondary alcohol is removed, recovering as bottoms a substantially anhydrous mixture comprising the bulk of the secondary alcohol, a substantial amount of that part of said light organic impurity which forms no binary minimum boiling mixture with said alcohol and substantially all the heavy polymer content of the crude alcohol but materially devoid of light polymer and then distilling from said bottom product only such a part of the secondary alcohol content as will leave as a second bottom product a mixture of said heavy polymer and said alcohol which is substantially stable toward resinification under said distillation conditions.

6. In a process of producing a secondary alcohol by absorption of the corresponding olefine in a mineral acid acting medium and hydrolysis of the resulting absorption product the step of distilling from a substantially anhydrous mixture comprising said alcohol and heavy polymer material but materially devoid of light polymer such a part of the secondary alcohol content as will leave as bottoms a mixture of said heavy polymer and said alcohol which is substantially stable toward resinification under the conditions of said distillation.

7. In a process of producing a secondary alcohol by absorption of the corresponding olefine in a mineral acid acting medium and hydrolysis of the resulting absorption product the step of distilling from a substantially anhydrous mixture comprising said alcohol and heavy polymer material but materially devoid of light polymer such a part of the secondary alcohol content as will leave as bottoms a mixture containing not more than about 40% by weight of said heavy polymer material.

8. In a process of producing a secondary alcohol by absorption of the corresponding olefine in a mineral acid acting medium and hydrolysis of the resulting absorption product the steps of distilling a crude secondary alcohol mixture comprising said alcohol, water, heavy polymer material and a mixture of light organic impurities including light polymer a substantial part of which forms a minimum boiling mixture containing alcohol when water is present but not in the absence of water to produce therefrom a substantially anhydrous mixture comprising the bulk of said alcohol, substantially all of said heavy polymer material and at least a substantial part of the light organic impurities which form no minimum boiling mixture with said alcohol in the absence of water but materially devoid of light polymer, and then distilling from said anhydrous mixture such a part of the secondary alcohol content as will leave as bottoms a mixture of said heavy polymer and said alcohol which is substantially stable toward resinification under the conditions of said distillation.

9. In a process of producing a secondary alcohol by absorption of the corresponding olefine in a mineral acid acting medium and hydrolysis of the resulting absorption product the step of distilling from a crude secondary alcohol mixture comprising said alcohol, water, heavy polymer material and a mixture of light organic impurities a substantial part of which light impurities forms a minimum boiling mixture containing alcohol when water is present but not in the absence of water, an overhead product comprising substantially all of said water, a minor part of said secondary alcohol and a substantial part of said light organic impurities including polymer and leaving as bottom product the major part of said alcohol, substantially all of said heavy polymer material and at least a substantial part of the light organic impurities which form no minimum boiling mixture with said alcohol in the absence of water.

10. In a process of producing secondary butyl alcohol by absorption of a normal butylene in a mineral acid acting medium and hydrolysis of the resulting absorption product the step of distilling a mixture comprising secondary butyl alcohol, water, heavy polymer material and a mixture of light organic impurities including light polymer formed in the manufacture of said alcohol at a temperature at which said mixture may be divided into a top product comprising substantially all of said water, a minor part of the secondary butyl alcohol and a part of said light organic impurities including polymer and a bottom product comprising the major part of said secondary butyl alcohol, substantially all of said heavy polymer material and a substantial part of said light organic impurities.

11. In a process of manufacturing secondary butyl alcohol by absorption of a normal butylene in a mineral acid acting medium, hydrolysis of the absorption product and distillation of the resulting mixture the steps of distilling from the crude secondary butyl alcohol obtained a mixture boiling under atmospheric pressure at about 83° C. which comprises secondary butyl alcohol, water and light organic impurities including dibutylene, condensing said distillate, returning a substantial part of the light organic impurity content thereof to the distillation zone until substantially all the water is removed from the crude secondary butyl alcohol and recovering as a bottom product substantially anhydrous secondary butyl alcohol containing heavy polymer material present in the crude alcohol and a part of said light organic impurity but substantially devoid of dibutylene.

12. In a process of producing secondary butyl alcohol by absorption of a normal butylene in a mineral acid acting medium and hydrolysis of the resulting absorption product the step of distilling from a substantially anhydrous mixture comprising secondary butyl alcohol and heavy polymer material substantially devoid of dibutylene such a part of the secondary butyl alcohol content as will leave as bottoms a mixture of said heavy polymer and secondary butyl alcohol which is substantially stable toward resinification under the conditions of said distillation.

13. In a process of producing secondary butyl alcohol by absorption of a normal butylene in a mineral acid acting medium and hydrolysis of the resulting absorption product the step of distilling from a substantially anhydrous mixture comprising secondary butyl alcohol and heavy polymer material substantially devoid of dibutylene such a part of the secondary butyl alcohol content as will leave as bottoms a mixture comprising secondary butyl alcohol and said heavy polymer containing not more than about 40% by weight of the latter.

14. A process of purifying crude secondary butyl alcohol containing heat resinifiable heavy polymer material, water and a mixture of light organic impurities including polymer, obtainable by distillation of a hydrolyzed absorption product of a normal butylene in a mineral acid acting medium which comprises distilling said crude secondary butyl alcohol material in two major steps in the first of which a top product comprising all the water, a part of the light organic impurities including polymer and a minor part of the secondary butyl alcohol is removed and in the second of which distillation steps a bottom product substantially stable toward resinification under the conditions of said distillation is separated comprising a secondary butyl alcohol solution of substantially all said heavy polymer material and the remainder of said light organic impurities but materially devoid of light polymer, while the bulk of the secondary butyl alcohol is recovered in a substantially pure form.

PETRUS JURJEN ROELFSEMA.